United States Patent [19]

O'Driscoll et al.

[11] Patent Number: 5,725,245
[45] Date of Patent: Mar. 10, 1998

[54] DIFFUSER PLATE FOR AN AIRBAG GAS GENERATOR

[75] Inventors: Peter O'Driscoll, Los Altos; Donald Backlund, San Jose, both of Calif.

[73] Assignee: United Technologies Corporation, Hartford, Conn.

[21] Appl. No.: 724,046

[22] Filed: Sep. 17, 1996

[51] Int. Cl.$^6$ .................................................. B60R 21/28
[52] U.S. Cl. .................................................. 280/740; 280/742
[58] Field of Search .................................. 280/740, 736, 280/741, 742

[56] References Cited

U.S. PATENT DOCUMENTS

| | | | |
|---|---|---|---|
| 3,476,403 | 11/1969 | Richardson | 280/740 |
| 3,618,981 | 11/1971 | Leising | 283/740 |
| 4,902,036 | 2/1990 | Zander et al. | 280/736 |
| 5,316,749 | 5/1994 | Schmitt et al. | 423/385 |
| 5,318,323 | 6/1994 | Pietz | 280/736 |
| 5,324,075 | 6/1994 | Sampson | 280/736 |
| 5,405,164 | 4/1995 | Paxton et al. | 280/728.2 |
| 5,505,488 | 4/1996 | Allard | 280/740 |

*Primary Examiner*—Christopher P. Ellis
*Attorney, Agent, or Firm*—McAulay Fisher Nissen Goldberg & Kiel, LLP

[57] ABSTRACT

A gas generator for a passive airbag restraint has a housing including a combustion chamber and a gas passage end, the chamber containing a solid gas generating fuel. A diffuser plate having a plurality of orifices is located in the gas passage to direct a gas generated by the combustion of the solid fuel to an airbag. The diffuser plate is shaped preferably by bending or folding, to have a greater surface area than the cross-sectional area of the gas passage. The greater surface area allows for an increased number of orifices to maximize port area to increase gas flow therethrough.

7 Claims, 2 Drawing Sheets

DIFFUSER PLATE FOR AN AIRBAG GAS GENERATOR

TECHNICAL FIELD

This invention relates to an apparatus for inflating a passive restraint device such as a vehicle air bag, and more particularly to a diffusion plate mounted in a gas generator, the diffuser plate having a high port area to permit rapid airbag inflation.

BACKGROUND OF THE INVENTION

Passive restraint devices which deploy during a vehicle collision are known. These devices are commonly referred to as "airbags", because they deploy a gas filled bag to cushion impact and to limit operator or passenger contact with adjacent hard surfaces.

These devices rely on rapid gas generation for inflation after impact but before injury can occur. Most gas generators use combustible gas generating compositions which produce a large volume of non-toxic gas within a suitably short interval, on the order of about 35 milliseconds, sufficient to fully inflate the air cushion device. Typically, a solid gas generating fuel is located in a housing, and associated with means for igniting the composition in response to an impact to produce the gas that inflates the airbag.

There are two common passive restraint gas generators. One is an annular domed structure, commonly used in steering wheels, and another recently developed tubular gas generator, for use in an aircraft cabin or vehicle door (CABS). In the CABS gas generator, a cylindrical gas generating chamber contains a solid fuel and has an igniter at one end and a gas outlet at the other end. A diffuser plate is associated with the combustion chamber for retaining a pelletized fuel within the chamber while also providing sufficient open area for the generated gas to pass out of the combustion chamber to the airbag. A filter is usually located between the diffuser and airbag to remove particulates and to somewhat cool the gas before it reaches the airbag. Such a device is small, relatively compact and can be mounted in an instrument panel.

Fuel ignition is initiated through an electrically activated squib which contains a small amount of an electrically ignitable combustion material disposed adjacent to the fuel pellets. The squib is usually connected to a remote impact sensor, typically located in or adjacent to a probable impact location.

While such gas generators have been used, they have been somewhat difficult to install in the relatively small areas available in vehicles typically crowded with instruments and accessory equipment. Size is also a consideration in locating passive restraint devices in areas such as in an aircraft cabin or in vehicle doors. It is difficult to reduce the size because as the diameter is reduced, the degree of restriction through the diffuser plate increases. The plate must retain sufficient structure to avoid collapse at high pressure, and consequently, a reduction in diameter, reduces the number of holes for gas passage. However, there is a continuing need to reduce the size of the gas generators without sacrificing performance of the passive restraint devices.

SUMMARY OF THE INVENTION

It is an object of the present invention is to provide a gas generator including a diffuser plate which has an increased proportion of open area to maximize gas passage.

It is a further object of the present invention to provide a gas generator having a diffuser plate with increased open area but with a reduced cross-sectional area for reducing the overall size of the gas generating device.

It is yet another object of the present invention to provide a gas generator having a diffuser plate which is resistant to pressure loads, yet which has increased open area as compared to prior diffuser plates.

These and other objects of the present invention are achieved by a gas generator for a passive restraint device which comprises a combustion chamber, a solid gas generating fuel located in the combustion chamber, and a diffuser plate having a plurality of orifices to pass a gas generated by the combustion of the solid fuel therethrough, the diffuser plate mounted in an end of the chamber which is in fluid communication with an airbag, the diffuser plate having a greater surface area than the cross-sectional area of the gas passage.

In one embodiment, the diffuser plate has a folded construction with an undulated surface to increase the total surface area of the plate. This increased surface area maximizes the number and size of openings for achieving the optimum port area, without sacrificing structural strength or retention properties of the plate, allowing a reduction in the diameter of the gas passage and combustion chamber, without sacrificing performance.

DETAILED DESCRIPTION OF THE INVENTION

Figure 1:
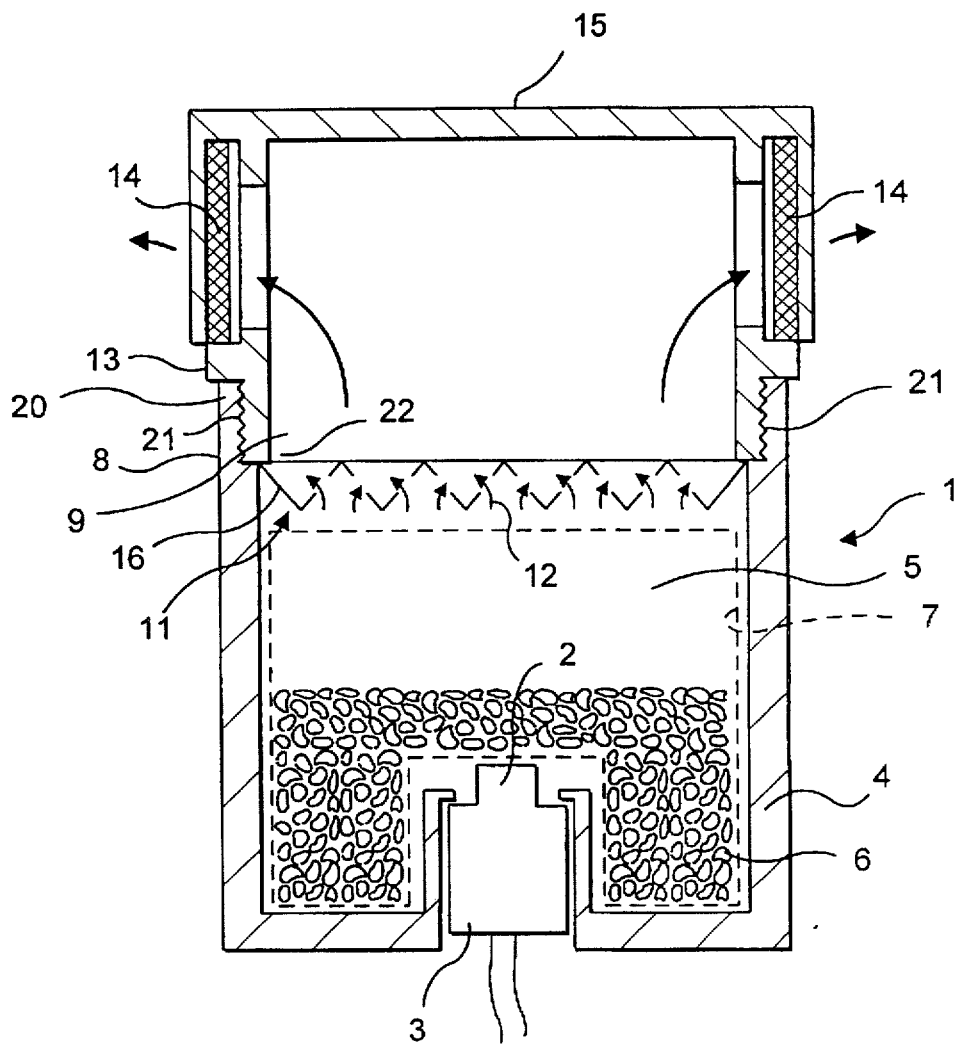
FIG. 1 is a cross-sectional view of a gas generator produced in accordance with the present invention.

Referring to FIG. 1, a gas generator 1 for a passive restraint device is shown. The gas generator 1 has a squib 2 connected to an igniter 3. The squib contains a small amount of an electrically ignitable material and is mounted in a tubular housing 4 which defines a combustion chamber 5. This ignitable material may, for example, comprise boron potassium nitrate, with a propellant, though various substitute materials are known in the art. A gas generating fuel 6 is provided in a bag 7 and located within the chamber 5. The choice of gas generating fuel is left to the user, as any of those available may be used with the present invention. The cross-sectional area of an end 8 of the housing defines a gas passage 9 such that gas formed in the combustion chamber exits through the passage.

A diffuser plate 10 is located in the gas passage, adjacent to the fuel 6. The plate has a plurality of holes 11 to allow gas to flow therethrough, as illustrated by the arrows 12. The plate also acts as a cover to retain the fuel 6 in the combustion chamber 5.

A threaded fitting 13 fixes the diffuser plate 10 in the gas passage to preclude its displacement after fuel ignition with the consequent pressurization of the combustion chamber. Gas exiting through the holes in the plate then passes through a filter 14 retained within a cap 15 prior to inflation of an airbag (not shown).

Figure 2:
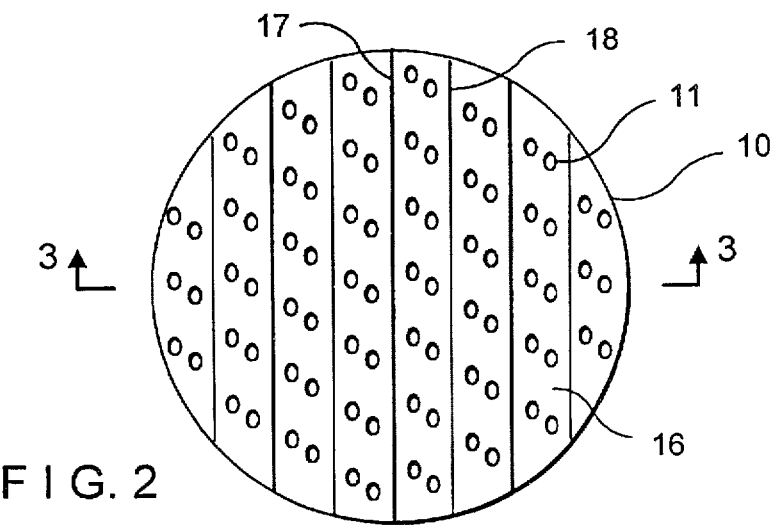
FIG. 2 is an enlarged top view of the diffuser plate of the invention.
Figure 3:
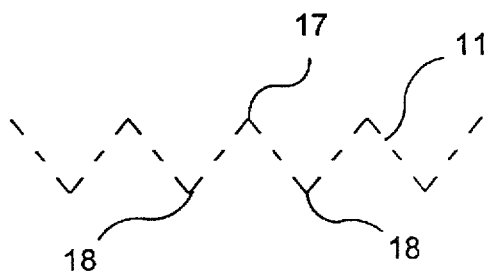
FIG. 3 is a side view of the diffuser plate of the present invention, taken along line 3—3 of FIG. 2.

Referring to FIG. 2, a top view of the diffuser plate is shown, FIG. 3 being a cross section of the plate, which has an undulated surface 16, with peaks 17 and valleys 18, so as to have a greater total surface area than the cross sectional area of the gas passage. The term "total surface area" means that the amount of surface area is not reduced by the amount of open or port area.

The number and size of holes in the plate depends on the projected gas flow and the degree of allowable restriction. Typically, a prior flat diffuser plate had a maximum port area of about 0.5 times the cross-sectional area of the gas passage. For example, a 2" diameter gas generator, would have a cross sectional area of 0.0218 ft$^2$, with a diffuser plate port area up to about 0.0109 ft$^2$. More open area would unduly weaken the plate in view of expected pressures, as more holes leave less material to provide structural support.

On the other hand, the diffuser plate of the invention can have an open area approaching about 0.9 times the cross-sectional area of the gas passage, without sacrificing strength as the amount of material removed is offset by the additional material available in the undulating portions of the plate. For example, with the same 2" diameter gas generator, a port area up to about 0.0196 ft$^2$ can be achieved. Such a degree of open area allows for a further compaction of the air bag device as the gas generator diameter can be reduced to take advantage of the increased port area.

Another advantage of the present invention is that the folded structure itself provides additional resistance to buckling for resisting the pressure load, allowing use of a thin, lightweight plate.

Figure 4:
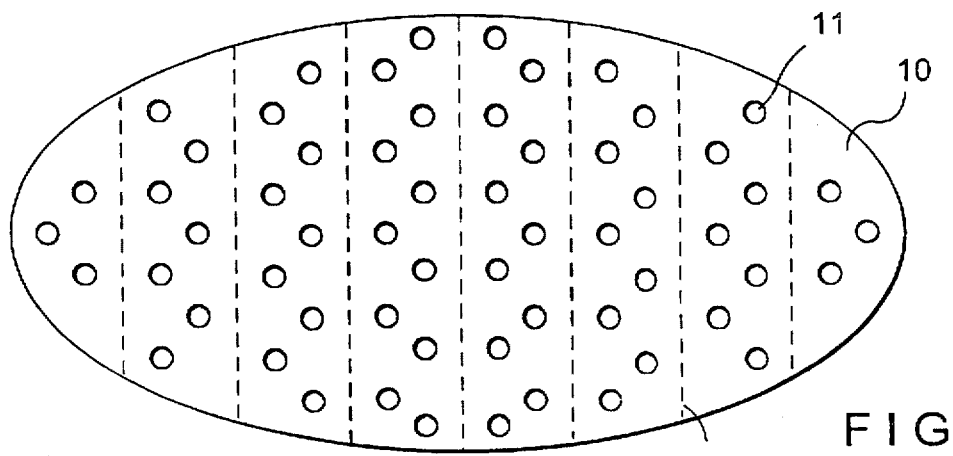
FIG. 4 is a top view of the diffuser plate of FIG. 3 before folding.

The diffuser plate is preferably produced of stainless steel, in a flat elliptical form as shown in FIG. 4. The elliptical form is chosen so as to achieve a circular circumference after folding. This plate is then processed to produce the holes, which may be provided by drilling, etching, milling, punching or another technique. Hole location is preferably organized in accordance with the expected fold lines 19 in the plate, so as to avoid placing holes in the folds themselves.

The diffuser plate in accordance with the present invention may be supported within the combustion chamber by resting on a step provided by a fitting or other member. Referring again to FIG. 1, the housing 4 has a wall 20 having a threaded recess 21. The retainer 13 is threaded into the recess, the retainer having an end 22 which supports the diffuser plate 10 within the chamber.

Figure 5:
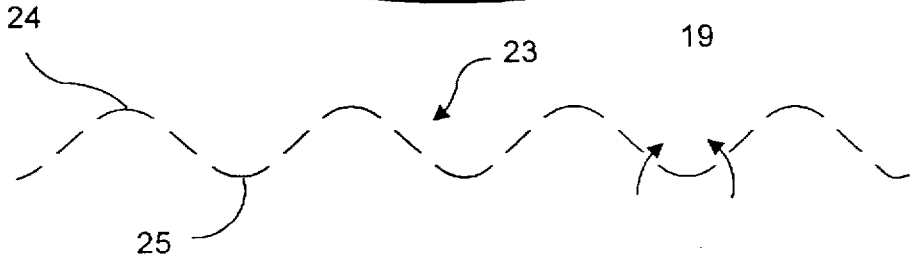
FIG. 5 is an alternative embodiment of the present invention.

Referring to FIG. 5, an alternative embodiment of the present invention is shown. A plate 23 has a plurality of undulations 24 in the form of smooth radius bends 25, rather than using sharp fold lines. As with the embodiment described above, the total surface area exceeds the cross-sectional area of the gas passage, allowing an increase in port area with a reduction in the size of the gas generating device.

While preferred embodiments of the present invention have been shown and described, it will be understood by those skilled in the art that various changes or modifications could be made without varying from the scope of the present invention.

We claim:

1. A gas generator for a passive restraint device comprising a housing with a combustion chamber having an end defining a gas passage, solid gas generating fuel located in the combustion chamber, and a diffuser plate having a plurality of orifices to pass a gas generated by the combustion of the solid fuel therethrough, the diffuser plate mounted in the gas passage and a port area of from about 50 to about 90 percent of the gas passage cross-sectional area adjacent to the fuel, the diffuser plate having a greater surface area than the cross-sectional area of the gas passage.

2. The gas generator of claim 1 wherein the diffuser plate is formed from an elliptical plate which is folded so as to provide a circular circumference.

3. The gas generator of claim 1 wherein the diffuser plate has an undulated surface.

4. The gas generator of claim 1 wherein the diffuser plate is formed of stainless steel.

5. A method for producing a gas generator for a passive restraint device comprising:

providing a housing having a combustion chamber and an end defining as gas passage;

placing a solid gas generating fuel in the combustion chamber;

providing a diffuser plate having a plurality of orifices for passing a gas generated by the solid fuel therethrough the diffuser plate having a greater surface area than the cross-sectional area of the gas passage and a port area of from about 50 to about 90 percent of the gas passage cross-sectional area; and, mounting the diffuser plate in the gas passage adjacent to the fuel.

6. The method of claim 5 further comprising folding the diffuser plate such that it has an undulated surface with peaks and valleys.

7. The method of claim 5 further comprising bending the diffuser plate such that it has an undulated surface.

* * * * *

UNITED STATES PATENT AND TRADEMARK OFFICE
CERTIFICATE OF CORRRECTION

PATENT NO. : 5,725,245
DATED : March 10, 1998
INVENTOR(S) : Peter O'Driscoll, et al.

Page 1 of 2

It is certified that error appears in the above-identified patent and that said Letters Patent is hereby corrected as shown below:

On the title page: Item [56] insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 3 | 7 | 7 | 3 | 3 | 5 | 1 | 1973 | Catanzarite | | | |
| | | 3 | 8 | 2 | 7 | 7 | 1 | 5 | 1974 | Lynch | | | |
| | | 3 | 9 | 4 | 9 | 7 | 3 | 3 | 1976 | Miller et al. | | | |
| | | | | | | | | | | | | | |

UNITED STATES PATENT AND TRADEMARK OFFICE
CERTIFICATE OF CORRRECTION

PATENT NO. : 5,725,245

DATED : March 10, 1998

INVENTOR(S) : Peter O'Driscoll, et al.

It is certified that error appears in the above-identified patent and that said Letters Patent is hereby corrected as shown below:

FOREIGN PATENT DOCUMENTS

| | | DOCUMENT NUMBER | | | | | | | PUBLICATION DATE | COUNTRY OR PATENT OFFICE | CLASS | SUBCLASS | TRANSLATION | |
|---|---|---|---|---|---|---|---|---|---|---|---|---|---|---|
| | | | | | | | | | | | | | YES | NO |
| | | 3 | 9 | 1 | 7 | 4 | 6 | 0 | 1989 | Germany | | | | |
| | | | | | | | | | | | | | | |

Signed and Sealed this

Twenty-seventh Day of April, 1999

Attest:

Q. TODD DICKINSON

*Attesting Officer*          *Acting Commissioner of Patents and Trademarks*